United States Patent [19]

Shigeki et al.

[11] Patent Number: 4,513,044
[45] Date of Patent: Apr. 23, 1985

[54] COLORED WEATHER STRIP

[75] Inventors: Kiyoshi Shigeki, Shyuchi; Kunio Maeno, Ama, both of Japan

[73] Assignee: Toyoda Gosei Co., Ltd., Nishikasugaigun, Japan

[21] Appl. No.: 566,707

[22] Filed: Dec. 29, 1983

[30] Foreign Application Priority Data

Dec. 30, 1982 [JP] Japan .................. 57-198222

[51] Int. Cl.³ ............................. E06B 7/16
[52] U.S. Cl. .................... 428/122; 49/490; 49/498; 52/716; 428/358
[58] Field of Search ............. 49/490, 498; 428/122, 428/31, 358; 52/716

[56] References Cited

U.S. PATENT DOCUMENTS 3,167,825 2/1965 Zoller .................................... 49/490
3,981,958 9/1976 Nakashima et al. ................ 525/265
4,411,941 10/1983 Azzola ................................ 428/122

Primary Examiner—Henry F. Epstein
Attorney, Agent, or Firm—Cushman, Darby & Cushman

[57] ABSTRACT

A colored weather strip attached to a flange on an automobile body defining a door opening. It has a sealing portion, and a U-shaped trim portion formed from solid rubber and joined integrally with the sealing portion. The trim portion has an outer surface covered by a colored solid rubber layer having a color which differs from those of the sealing and trim portions.

1 Claim, 4 Drawing Figures

COLORED WEATHER STRIP

BACKGROUND OF THE INVENTION

1. Field of the Invention

This invention relates to a weather strip. More particularly, it is concerned with a weather strip which is provided on a flange defining a door opening in an automobile body for sealing the clearance between the body and the door against the entry of rain or wind and absorbing any shock produced when the door is opened or closed, and any vibration made by the door when the automobile is running.

2. Description of the Prior Art

A weather strip of this type usually comprises a sealing portion 1 formed from sponge rubber, and a U-shaped trim portion 5 formed from solid rubber in which a metal core 3 is embedded, and joined integrally with the sealing portion 1, as shown in FIG. 1. The weather strip has hitherto been totally of black color, but nowadays often has on the outer surface of its trim portion 5 a colored solid rubber layer 7 of a color matching the color of the interior of the automobile.

The colored weather strip is attached to a flange 9 on the automobile body as shown in FIG. 2. When a door 11 has been closed as shown, however, the black color of the sealing portion 1 is visible from a certain angle as indicated by an arrow in FIG. 2, and destroys the harmony of colors between the interior of the automobile and the weather strip.

SUMMARY OF THE INVENTION

This invention relates to a colored weather strip attached to a flange on an automobile body defining a door opening. It comprises a sealing portion formed from sponge rubber, and a U-shaped trim portion joined integrally with the sealing portion, formed from solid rubber in which a metal core is embedded, and having an outer surface covered by a colored solid rubber layer which extends over the outer surface of the sealing portion to a point close to a closed door.

It is, therefore, an object of this invention to provide a colored weather strip attached to a flange on an automobile body defining a door opening, and which can maintain the harmony of colors in the interior of the automobile when the door is closed.

It is another object of this invention to provide a colored weather strip which has a long life without having any frequent separation of its sealing portion from its trim portion in the boundary area where the deformation of the sealing portion which occurs when the door is opened or closed is supported.

These objects are attained by a colored solid rubber layer extending across the boundary between the sealing and trim portions and further covering the outer surface of the sealing portion.

DESCRIPTION OF THE PREFERRED EMBODIMENT

Figure 1:
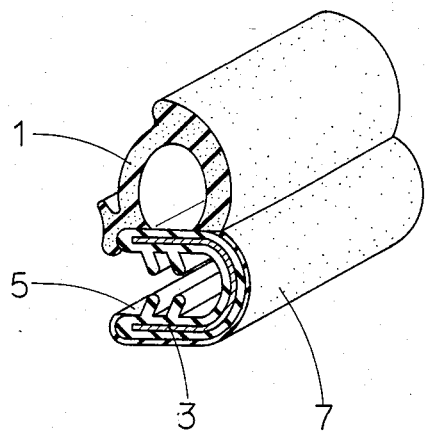
FIG. 1 is a perspective view of a conventional colored weather strip.
Figure 2:
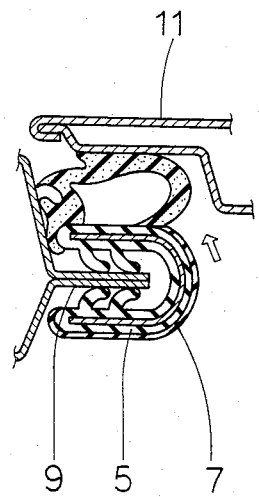
FIG. 2 is a cross sectional view of the weather strip of FIG. 1 mounted in an automobile.
Figure 3:
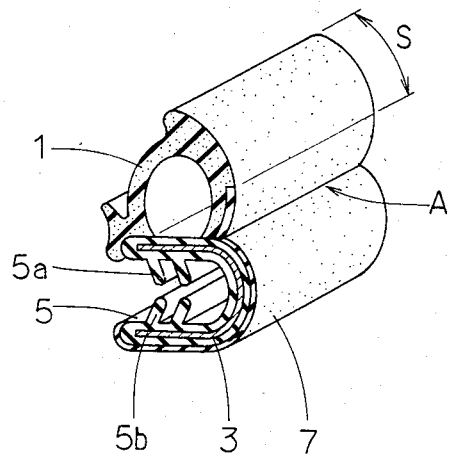
FIG. 3 is a view similar to FIG. 1, but showing a colored weather strip embodying this invention.

A weather strip embodying this invention is shown in FIG. 3, and comprises a sealing portion 1 formed from sponge rubber, a U-shaped trim portion 5 formed from solid rubber and joined integrally with the sealing portion 1, and a metal core 3 embedded in the trim portion 5. The trim portion 5 has an outer surface covered by a colored solid rubber layer 7. The colored layer 7 extends over the outer surface of the sealing portion 1 up to a point close to a sealing area S with which a door 11 is brought into contact when it is closed. Therefore, the colored layer 7 conceals the color of that part of the sealing portion 1 which is visible from the interior of the automobile. The weather strip may usually be extrusion molded in such a manner that the sealing portion 1, the trim portion 5 and the colored layer 7 may be simultaneously formed from black sponge rubber, black solid rubber and differently colored solid rubber, respectively, and then, the trim portion 5 may be appropriately bent into its U shape. In order to achieve good moldability and adhesion, all the parts of the weather strip are formed from the same kind of rubber, such as EPDM or NBR.

Figure 4:
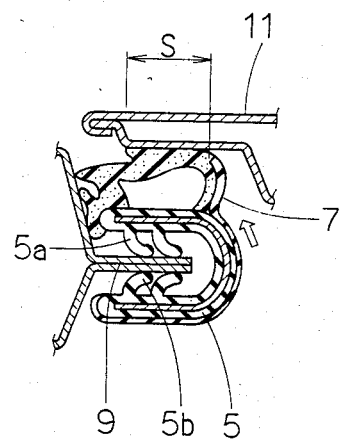
FIG. 4 is a view similar to FIG. 2, but showing the weather strip of FIG. 3.

The weather strip is attached to a flange 9 on an automobile body defining a door opening, as shown in FIG. 4. The trim portion 5 is provided in its interior with two pairs of holding lips 5a and 5b facing each other. The flange 9 is secured between the lips 5a and 5b, as shown in FIG. 4. If the door 11 is closed, it abuts on the sealing area S of the sealing portion 1 to seal the clearance between the door 11 and the automobile body and damp any vibration of the door which occurs when the automobile is running. The colored layer 7 covering the outer surface of the trim portion 5 and further extending to a point close to the door 11 in its closed position conceals the black color of the sealing portion 1 in whichever direction it is seen from the interior of the automobile, and thereby maintains the harmony of colors in the interior of the automobile.

What is claimed is:

1. A colored weather strip for attachment to a flange on an automobile body defining a door opening, said strip comprising:

a sealing portion formed from sponge rubber and having an outer surface including a door sealing area;

a U-shaped trim portion joined integrally with said sealing portion, formed from solid rubber;

a metal core being embedded in said solid rubber of said trim portion; and a colored solid rubber layer having a color which differs from those of said sealing and trim portions, said colored layer covering an outer surface of said trim portion and extending beyond said trim portion to cover a part of said cover surface of said sealing portion to a point close to but not into said door sealing area.

* * * * *